United States Patent
Matusik et al.

(10) Patent No.: US 7,420,590 B2
(45) Date of Patent: Sep. 2, 2008

(54) VIDEO MATTING USING CAMERA ARRAYS

(75) Inventors: Wojciech Matusik, Cambridge, MA (US); Shmuel Avidan, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 344 days.

(21) Appl. No.: 11/388,499

(22) Filed: Mar. 24, 2006

(65) Prior Publication Data

US 2007/0070200 A1    Mar. 29, 2007

Related U.S. Application Data

(63) Continuation-in-part of application No. 11/238,741, filed on Sep. 29, 2005.

(51) Int. Cl.
*H04N 7/18* (2006.01)
(52) U.S. Cl. .................................... 348/159; 382/300
(58) Field of Classification Search ................. 382/300, 382/260; 348/159, 275, E5.058
See application file for complete search history.

(56) References Cited

U.S. PATENT DOCUMENTS

| 6,538,396 | B1 * | 3/2003 | Vlahos et al. | 315/292 |
| 6,738,496 | B1 * | 5/2004 | Van Hall | 382/101 |
| 2004/0062439 | A1 * | 4/2004 | Cahill et al. | 382/173 |
| 2006/0221248 | A1 * | 10/2006 | McGuire et al. | 348/587 |
| 2007/0013813 | A1 * | 1/2007 | Sun et al. | 348/587 |

OTHER PUBLICATIONS

Buehler, C., Bosse, M., McMillan, L., Gortler, S., and Cohen, M. 2001. Unstructured lumigraph in rendering. In Computer Graphics, Siggraph 2001 Proceedings, 425-432.
Chuang, Y.-Y., Zongker, D. E., Hindorff, J., Curless, B., Salesin, D. H., and Szeliski, R. 2000. Environment matting extensions: towards higher accuracy and real-time capture. In Proceedings of the 27th annual conference on Computer graphics and interactive techniques, ACM Press/Addison-Wesley Publishing Co., 121-130.
Chuang, Y.-Y., Curless, B., Salesin, D. H., and Szeliski, R. 2001. A bayesian approach to digital matting. In Proceedings of the IEEE CVPR 2001, IEEE Computer Society, vol. 2, 264-271.
Chuang, Y.-Y., Agarwala, A., Curless, B., Salesin, D. H., and Szeliski, R. 2002. Video matting of complex scenes. ACM Transactions on Graphics 21, 3 (July), 243-248. Sepcial Issue of the Siggraph 2002 Proceedings.

(Continued)

*Primary Examiner*—Samir A. Ahmed
*Assistant Examiner*—Stephen R Koziol
(74) *Attorney, Agent, or Firm*—Dirk Brinkman; Clifton D. Mueller; Gene V. Vinokur

(57) ABSTRACT

A method and system for determining an alpha matte for a video is presented. A set of videos is acquired by an array of cameras. A centrally located camera in the array is designated as a reference camera and acquires a reference video. A foreground depth plane is selected from the set of videos. A trimap is determined from variances of pixel intensities in each image. Variances of the intensities of pixels labeled as background and pixels labeled as foreground are extrapolated to the pixels labeled as unknown in the trimap. Means of the intensities of the pixels labeled as background are extrapolated to the pixels labeled as unknown to determine an alpha matte for the reference video.

14 Claims, 3 Drawing Sheets

OTHER PUBLICATIONS

Isaksen, A., McMillan, L., and Gortler, S. J. 2000. Dynamically reparameterized light fields. In Proceedings of the 27th annual conference on Computer graphics and interactive techniques, ACM Press/Addison-Wesley Publishing Co., 297-306.

Kolomogrov, V., Criminisi, A., Blake, A., Cross, G., and Rother, C. 2005. Bi-layer segmentation of binocular stereo video. In Proceedings of CVPR05.

Li, Y., Sun, J., and Shum, H.-Y. 2005. Video object cut and paste. ACM Transactions on Graphics (August).

McGuire, M., Matusik, W., Pfister, H., Durand, F., and Hughes, J. 2005. Defocus Video Matting. ACM Transactions on Graphics 24, 3 (Aug.).

Smith, A. R., and Blinn, J. F. 1996. Blue screen matting. In Proceedings of the 23rd annual conference on Computer graphics and interactive techniques, ACM Press, 259-268.

Sun, J., Jia, J., Tang, C.-K., and Shum, H.-Y. 2004. Poisson matting. ACM Transactions on Graphics (August).

Wang, J., Bhat, P., Colburn, A., Agrawala, M., and Cohen, M. 2005. Interactive video cutout. ACMTransactions on Graphics (August).

Wexler, Y., Fitzgibbon, A., and Zisserman., A. 2002. Bayesian estimation of layers from multiple images. In Proceedings of 7th European Conference on Computer Vision (ECCV).

Wilburn, B., Joshi, N., Vaish, V., Talvala, E.-V., Antunez, E., Barth, A., Adams, A., Horowitz, M., and Levoy, M. 2005. High performance imaging using large camera arrays. ACM Trans. Graph. 24, 3, 765-776.

Zitnick, C. L., Kang, S. B., Uyttendaele, M., Winder, S., and Szeliski, R. 2004. High-quality video view interpolation using a layered representation. ACM Trans. Graph. 23, 3, 600-608.

Zongker, D. E., Werner, D. M., Curless, B., and Salesin, D. H. 1999. Environment matting and compositing. In Proceedings of the 26th annual conference on Computer graphics and interactive techniques, ACM Press/Addison-Wesley Publishing Co., 205-214.

* cited by examiner

VIDEO MATTING USING CAMERA ARRAYS

RELATED APPLICATION

This application is a continuation-in-part of U.S. patent application Ser. No. 11/238,741 entitled "Matting Using Camera Arrays" and filed by Matusik et al. on Sep. 29, 2005.

FIELD OF THE INVENTION

This invention relates generally to processing images, and more particularly to video matting.

BACKGROUND OF THE INVENTION

Efficient and high-quality compositing of images is an important task in the special effects industry. Typically, movie scenes are composited from two different layers, foreground and background, where each layer can be computer-generated or real, and may be filmed at different locations. Often, the foreground content of a source video is used as the foreground layer in a composite video, which requires segmentation of foreground from background in the source video.

The process of segmenting an image into foreground and background is referred to as 'pulling' an alpha matte or 'matting'. The most popular method for pulling alpha mattes is blue-screen matting, in which actors are imaged in front of a blue or green background. The limitation of blue-screen matting is that it can only be used in a studio or a similarly controlled environment and can not be used in natural indoor or outdoor settings.

Natural video matting refers to pulling alpha mattes from a video acquired in a natural environment. With a single video stream, the problem of matte extraction can be posed as an equation in several unknowns: alpha ($\alpha$), RGB foreground ($F_{RGB}$), RGB background ($B_{RGB}$). The RGB video frame I at each pixel is $$I_{RGB} = \alpha F_{RGB} + (1-\alpha) B_{RGB}. \quad (1)$$

With a single image, this problem is highly underconstrained.

The first matting methods and systems were described almost fifty years ago. Blue-screen matting was formalized by Smith and Blinn, "Blue screen matting," Proceedings of the 23rd Annual Conference on Computer Graphics and Interactive Techniques, pp. 259-268, ACM Press, 1996. They showed that imaging a foreground against two different backgrounds gives a robust solution for both the alpha and the foreground color. That method has been extended to work with more complex light transport effects, e.g., refraction. However, those methods require active illumination and acquiring multiple images.

Bayesian matting was initially developed for static scenes. It assumes a low-frequency background and a user specified trimap. Generally, a trimap includes pixels labeled as foreground, pixels labeled as background, and pixels labeled as unknown. Matting requires that the unknown pixels are labeled correctly.

That method was later extended to videos. However, trimaps still need to be specified manually for key frames. In another extension, a multi-camera system is used to reconstruct 3D scene geometry. High-quality alpha mattes are determined at depth discontinuities.

Poisson matting poses alpha matting as solving Poisson equations of the matte gradient field. It does not work directly on the alpha but on a derived measurement, and conventionally works on still images, requires some user intervention, and takes several minutes to process a single frame.

Video matting for natural scenes is described by Wang et al., "Interactive video cutout," ACM Transactions on Graphics, August 2005; and Li et al., "Video object cut and paste," ACM Transactions on Graphics, August 2005. Wang et al. focus on providing an efficient user interface to achieve the task, while Li et al. use a novel 3D graph cut algorithm, followed by manual refinement to prepare the data for alpha matting.

Another method determines alpha mattes for natural video streams using three video streams that share a common center of projection but vary in depth of field and focal plane, McGuire et al., "Defocus Video Matting," ACM Transactions on Graphics, August 2005. While their method is automatic, the running time for their method is many minutes per frame. In addition, the foreground object must be in focus.

Other methods consider bounded reconstruction and graph cuts, see Wexler et al., "Bayesian estimation of layers from multiple images," Proceedings of 7th European Conference on Computer Vision (ECCV); and Kolmogorov et al., "Bilayer segmentation of binocular stereo video," Proceedings of CVPR05, 2005. Wexler et al. pose the problem in a Bayesian framework and consider several different priors including bounded reconstruction, $\alpha$-distribution and spatial consistency. They do not describe real-time aspects of their system. Kolmogorov et al. on the other hand, do not focus on alpha matting but rather describe a real-time system that uses graph cuts on a stereo video to perform the foreground and background segmentation.

Camera arrays have been used for a wide variety of applications in computer graphics and computer vision, see generally, Wilburn et al., "High performance imaging using large camera arrays," ACM Transactions on Graphics, vol. 24, no. 3, pp. 765-776, 2005.

SUMMARY OF THE INVENTION

The embodiments of the invention provide high-quality natural video matting using a camera array. The system acquires high frequencies present in natural scenes by generating a synthetic aperture image that is focused on the foreground. This reduces the variance of pixels reprojected from the foreground while increasing the variance of pixels reprojected from the background.

The method works directly with variance measurements and uses these statistics to construct a trimap that is later upgraded to an alpha matte. The entire process is completely automatic, including an auto-focus method for the synthetic aperture image, and an automatic method to determine the trimap and the alpha matte.

The method is efficient and has a per-pixel running time that is linear in the number of cameras. The system runs at several frames per second, and is capable of determining high-quality alpha mattes at near real-time rates without the use of any active illumination or a special background.

DETAILED DESCRIPTION OF THE PREFERRED EMBODIMENT

Figure 1:
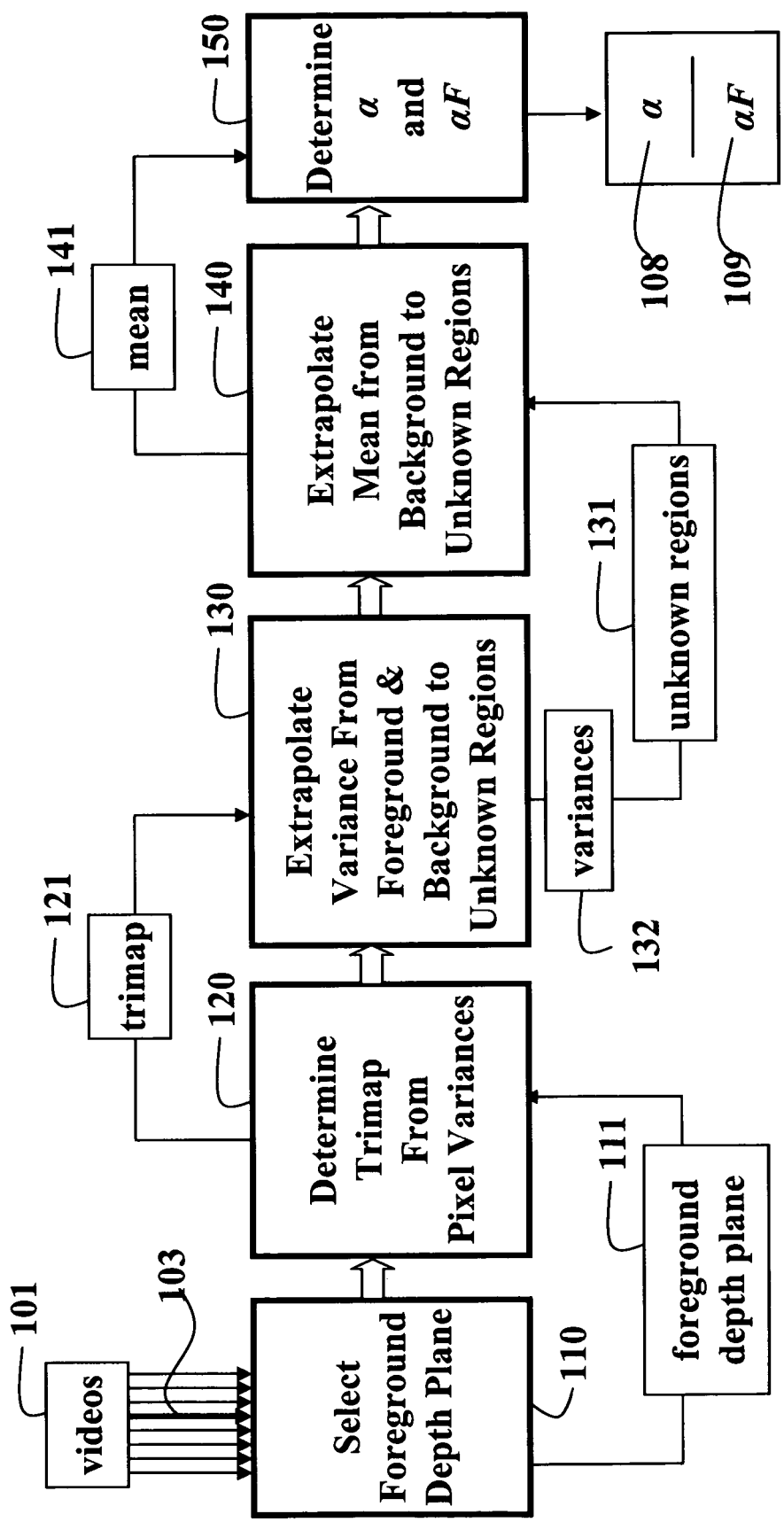
FIG. 1 is a flow diagram of extracting an alpha matte according to an embodiment of the invention.
Figure 2:
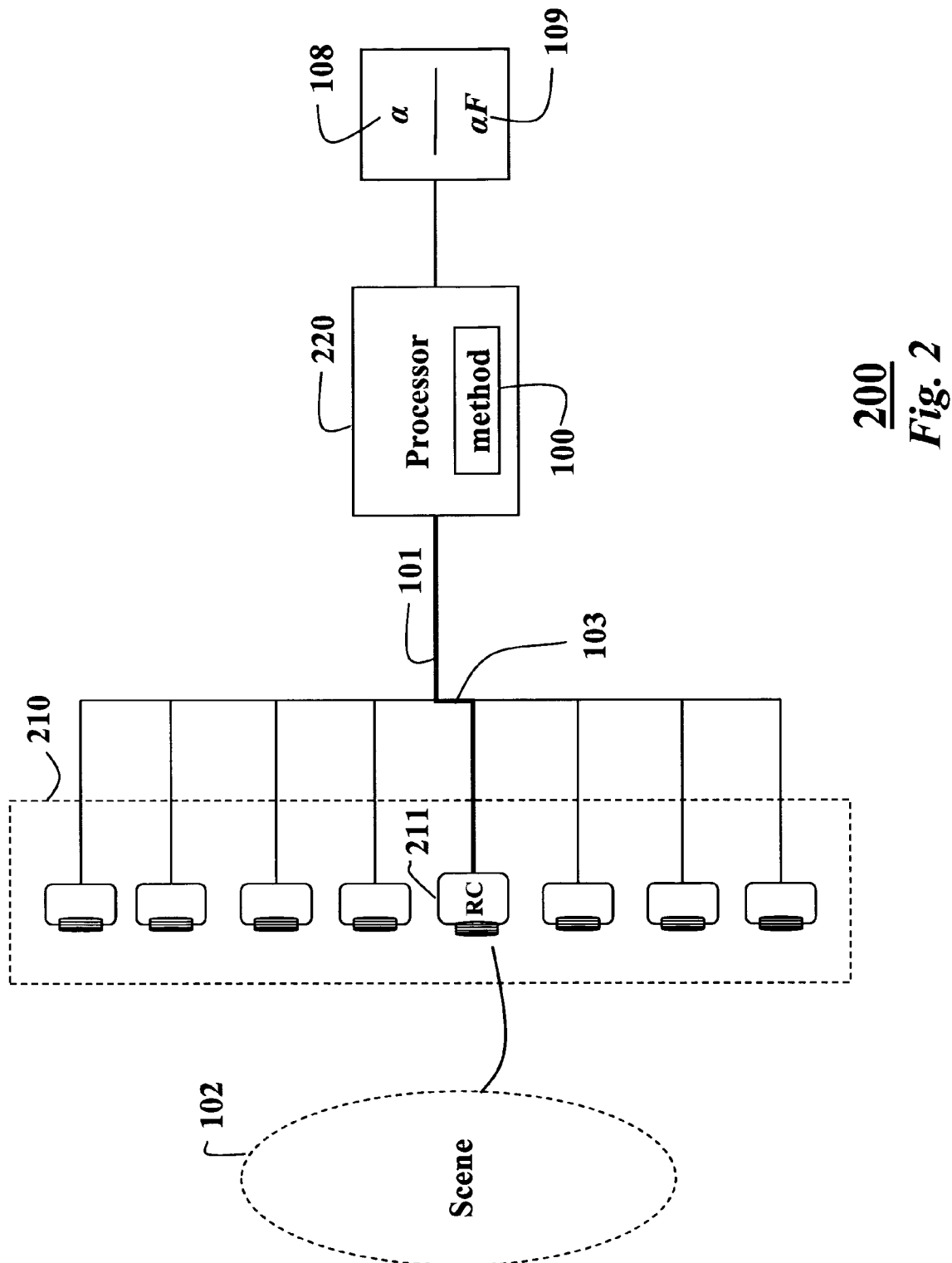
FIG. 2 is block diagram of a system for extracting an alpha matte according to an embodiment of the invention.

FIG. 1 shows a method 100 according to an embodiment of our invention. FIG. 2 shows a system 200 according to an embodiment of the invention. The method 100 and system 200 determine an alpha matte (α) 108 and an alpha multiplied foreground (αF) 109. The method 100 operates according to instructions executed in a processor 220.

Input to the method and system are a set of videos 101 of a scene 102 acquired by an array of cameras 210, e.g., eight cameras. One substantially centrally located camera is designated a reference camera (RC) 211. The alpha matte is determined for a reference video 103 acquired by the reference camera 211.

After selecting 110 a foreground depth plane 111, the method determines 120 a trimap 121. Generally, the trimap includes pixels labeled as foreground, pixels labeled as background, and pixels labeled as unknown. Matting requires that the unknown pixels are labeled correctly. A correctly labeled trimap then becomes an alpha matte 108.

In contrast with the prior art, the trimap is determined automatically, i.e., without user interaction. In addition, the method uses higher order statistics, i.e., variances 132, of image measurements. The higher order statistics are extrapolated 130 into unknown regions 131 of the trimap. Unknown regions include pixels that could either be foreground or background. The goal is to label the unknown pixels as foreground or background with certainty.

Although some prior art methods extrapolate measurements into the unknown regions, they extrapolate pixel intensity values directly, which makes limiting assumptions about the scene content. Extrapolating variances is much less limiting.

Specifically, our method proceeds as follows. A foreground depth plane 111 is selected 110 automatically. A trimap 121 is determined 120 based on pixel variances. The variances 132 from the background and foreground regions are extrapolated 130 to the unknown regions 131 of the trimap 121. A mean 141 is extrapolated 140 from the background into the unknown regions 131, and α 108 and αF 109 are determined 150.

We use a linear array of eight Basler cameras. A resolution of each camera is 640×480 pixels. The cameras have external hardware triggers and can provide synchronized videos at up to thirty frames per second. All cameras are connected to a 3 GHz processor 220.

We geometrically calibrate the extrinsic and intrinsic parameters of our camera array using conventional computer vision methods. The centers of projection of our cameras are arranged in a line. Furthermore, we determine homographies that rectify all camera planes. We perform basic color calibration by placing a Macbeth color checker in the scene so that the checker is viewable by all cameras. We compute a color transform for each camera to match its image of the color checker to that of the reference camera 211. We also perform vignetting calibration, which significantly improve the quality of our variance estimates and, by extension, our trimaps 121 and alpha mattes 108.

When the method is performed in real time, it can process quarter-VGA images at several frames per second. In an off-line mode, high-quality VGA results are produced at about one frame per second. The distinction between the two modes is in the search stage.

Specifically, in the off-line mode, we perform our depth search for every pixel, whereas in the on-line mode, we compute the variance for one depth plane only, remove high variances due to non-planarity of the foreground, and then preform our depth search only for the pixels in the unknown region of the trimap.

The method 100 determines a synthetic aperture image, a variance image, as well as the trimap for the foreground depth plane 111.

Automatically Selecting Foreground Depth

We use a synthetic refocusing to select 110 the foreground depth plane 111. We automatically select the foreground depth by sweeping a plane in space and selecting a closest depth at which a variance within a predefined rectangle in the image is minimized. If the variance is low, then at that depth plane, a number of features are aligned. Because the foreground object can be in different parts of the image, we define several such rectangles and select the rectangle with the smallest variance. A "manual focus" allows a user to override the automatic focusing when necessary.

We allow the user to select the foreground depth by interactively sliding the synthetic plane of focus through the scene. The synthetic aperture image is displayed in real-time so that the user can select the plane where the foreground object is best focused. We have found that this method is relatively simple and intuitive for selecting the foreground depth. An advantage of our camera array approach is that our system can handle multiple foreground objects by performing the method 100 several times to determine multiple depth planes, using a different foreground depth plane during each pass.

Automatic Trimap Determination

The conventional matting equation is per-pixel based. Hence, we determine the variance of each scene point for all the images. Because we acquire the entire scene in image I, we have to approximate the variance of the foreground F and the background B using nearby scene points.

For each point labeled as unknown in the trimap, we use the variance of its nearest foreground and background points to estimate var(F) and var(B). We can then determine the alpha matte as described below.

While trimaps have been used in the past as a step towards solving the alpha matte problem, they were often assumed to be supplied by the user interactively and not computed automatically, as we do in our system.

We begin trimap construction by computing the variance of each color channel and taking the magnitude of this vector of every pixel. Then, we use a double-threshold and dilation to compute the trimap. Specifically, we use a low threshold to compute a bimap, i.e., labeling of foreground vs. unknown pixels.

We use a combination of dilation and a higher threshold to determine the unknown region. That is, a high-variance pixel is considered part of the foreground, i.e., specularity, if the pixel is located next to foreground-labeled pixels. Relatively low-variance pixels, on the other hand, are classified as background if they are far away from the foreground. This combination of spatial and intensity analysis enables us to reliably construct quality trimaps.

We assume that the foreground object lies entirely on the specified foreground plane. However, a plane is often only a rough approximation of the depth of a foreground object. To handle non-planar foreground objects, we perform a local search over depth values to take the depth uncertainty into account. The search is performed by sweeping a plane over a small depth range near the foreground reference plane and storing the minimum variance value per-pixel over that range. This allows us to automatically adjust the focus slightly on a per-pixel basis.

Details

For a given instant in time, we have n images of a scene, e.g., eight. We consider the following matting equation of a given scene point (pixel) p:

$$\{I_i(p)=\alpha(p)F_i(p)+(1-\alpha(p))B_i(p)\}, \text{ for } I=1,\ldots,n, \quad (2)$$

where $I_i(p)$ corresponds to the actual intensity information of point p recorded at image i. $F_i(p)$ and $B_i(p)$ are the foreground and background values, which, as a function of the transparency of p, are mixed to give $I_i(p)$; and $\alpha(p)$ is this transparency value. We drop the notation p wherever possible to improve readability. Specifying a different $F_i$ for every image means that we allow for view-dependent effects, such as specularity. However, we assume that the transparency of the point is view-independent. Hence, $\alpha$ is fixed across all images.

We consider $\{I_i(p)\}$, $\{F_i(p)\}$, and $\{B_i(p)\}$ as sampling the random variables I, F, and B, respectively, and rewrite the matting equation using these variables:

$$I = \alpha F + (1-\alpha)B. \quad (3)$$

We solve for $\alpha$ and $\alpha F$ using these random variables and do this by using second-order moments of I, F and B, i.e., variances, to solve for $\alpha$ and first-order moments of I and B, i.e., means, to solve for $\alpha F$. Note that we do not use the mean of F.

Recall that the third and fourth steps 130 and 140 of our method extrapolate image measurements from the foreground and background labeled pixels to the unknown pixels. While one could extrapolate the mean pixel values of the foreground object and solve for an alpha matte using mean statistics alone, that assumes that foreground objects have low-frequency albedo, which is a very limiting assumption, whereas extrapolating the variances allows objects with both low and high-frequency albedo. This is an important point and is one of the advantages of our system and method.

Specifically, let p be the scene point under consideration and denote $p_F$ and $p_B$ as the closest points on the horizontal line of the reference image, i.e., the image from the central camera 211, that are labeled as foreground and background, respectively, in the trimap. We make the following approximations:

$$var(F_p) \approx var(Fp_F), \quad (4)$$

$$var(B_p) \approx var(Bp_B), \quad \text{and} \quad (5)$$

$$mean(B_p) \approx mean(Bp_B). \quad (6)$$

Figure 3:
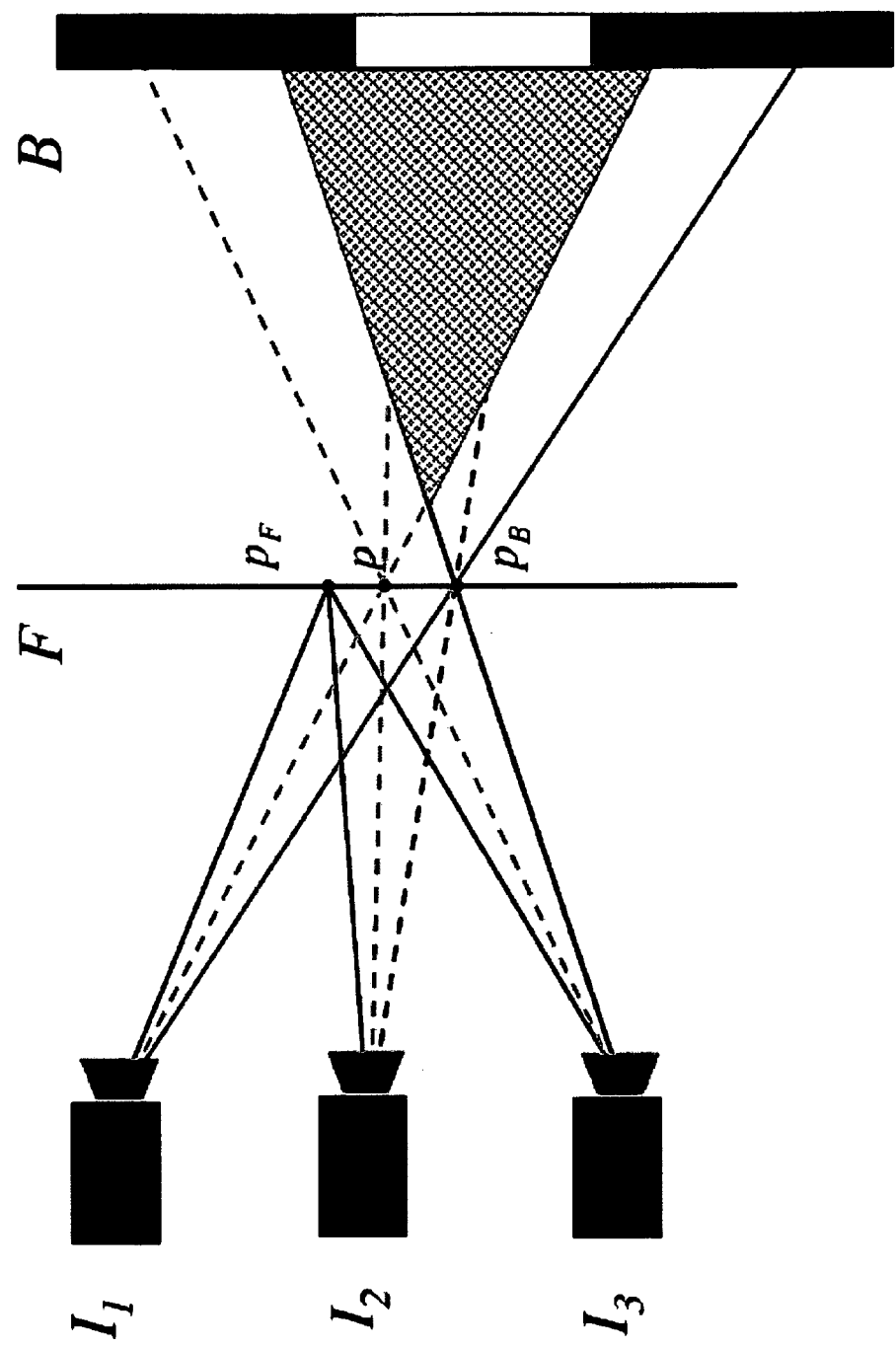
FIG. 3 is a schematic of points to be labeled in a foreground plane according to an embodiment of the invention.

As shown in FIG. 3 for images $I_1$, $I_2$, and $I_3$, these approximations make the two following assumptions. First and second-order statistics, e.g., mean and variance, of the closest background point $p_B$ are the same as the statistics of the corresponding background colors that scene point p is viewed against. This is a plausible assumption because, to a large degree, the rays going from the camera centers through points p and $p_B$ intersect similar background points, though not necessarily in the same order.

The ordering of samples is irrelevant in this case because variance estimation is invariant to the order of the samples. In practice, as the background is significantly far from the foreground object and the distance between p and $p_B$ is small, the ray bundles going through these two points overlap significantly. Second-order statistics of the closest foreground point $p_F$ are the same as the second-order statistics of the scene point p. This is equivalent to stating that view-independent properties, e.g., albedo, of the scene point and its closest foreground point can be completely different but their view-dependent statistics, e.g., specularity level, are the same.

Assuming that the values observed for the scene point p across all cameras are a fixed linear combination of two statistically independent variables, i.e., the foreground and background, we can rewrite the conventional matting equation in terms of the random variables I, F and B as $$I = \alpha F + (1-\alpha)B, \quad (7)$$

and the variance of these variables can be expressed as:

$$var(I) = var[\alpha F + (1-\alpha)B]. \quad (8)$$

If we assume that B and F are statistically independent, then $$\begin{aligned} var(I) &= var[\alpha F + (1-\alpha)B], \quad (9) \\ &= \{[(\alpha F + (1-\alpha)B) - \{F + (1-\alpha)B\}]^2\}, \\ &= \{[(\alpha F - \{F\}) + (1-\alpha)(B - \{B\})]^2\}, \\ &= \alpha^2\{(F-\{F\})^2\} + (1-\alpha)^2\{(B-\{B\})^2\}, \text{ and} \\ &= \alpha^2 var(F) + (1-\alpha)^2 var(B), \end{aligned}$$

where $\{X\}$ in these equations denotes the mean value of X. The assumption that B and F are statistically independent is manifested in going from the third to the fourth line of Equation (9), where the term $\alpha(1-\alpha)(F-\{F\})(B-\{B\})$ is assumed to be equal to zero. In order to determine $\alpha$ we need to solve a quadratic equation in $\alpha$:

$$[var(F)+var(B)]\alpha^2 - 2var(B)\alpha + [var(B)-var(I)] = 0. \quad (10)$$

The solutions to this quadratic equation are:

$$\alpha = (var(B) \pm \sqrt{\Delta})/(var(F)+var(B)), \text{ where} \quad (11)$$

$$\Delta = var(I)[var(F)+var(B)] - var(F)var(B). \quad (12)$$

This equation can be represented graphically as a parabola. A minimum of the equation is achieved at:

$$\alpha_{min} = (var(B))/(var(B)+var(F)), \quad (13)$$

and it is symmetric along the vertical axis $x = \alpha_{min}$. If $var(F) = var(B)$, then there are always two valid solutions to this quadratic equation, and based on this equation alone it is impossible to resolve the ambiguity.

Fortunately, in practice, this parabola is heavily shifted towards the right. This is because var(B) is typically a few orders of magnitude larger than var(F). Therefore, we have two cases. If $var(I) \geq var(F)$, then the solution $$(var(B) \pm \sqrt{\Delta})/(var(F)+var(B)) > 1,$$

which makes it an invalid solution.

If $var(I) < var(F)$, then the width of the parabola, i.e., the distance between the two solutions, is given by $$(2var(F))/(var(B)+var(F)),$$

which is very small and hence $\alpha_{min}$ can serve as a good approximation to either one.

Specifically, we evaluate $\alpha$ using the following equation:

$$\alpha \begin{cases} = \dfrac{var(B) - \sqrt{\Delta}}{var(F) + var(B)}, & var(I) \geq var(F); \\ \approx \alpha_{min}, & var(I) < var(F). \end{cases} \quad (14)$$

If we assume that our scene is diffuse, i.e., var(F)=0, then the expression has no ambiguity:

$$\alpha = 1 - \sqrt{\dfrac{var(I)}{var(B)}} \quad (15)$$

After $\alpha$ is recovered, we recover $\alpha F$ using the following equation:

$$\alpha F = \bar{I} - (1-\alpha)\bar{B}, \quad (16)$$

where Ī indicates the mean of the corresponding pixel values in all images, which is actually the pixel value in the synthetic aperture image. The value α is recovered from Equation (14), and B̄ is the mean of the background pixel value. For improved results, we determine a weighted mean of the background color with the highest weight placed on the images acquired by the central reference camera 211, and weight reducing for cameras that are farther away from the center.

We assume that alpha is fixed and not view-dependent. While true in practice for many objects, some materials do exhibit view-dependent alpha. Most commonly, this is due to self-occlusion. Self-occlusion causes a high variance for pixels in the synthetically refocused image. This results in an incorrect alpha value. Using a narrow baseline for our cameras limits these errors. If the background is a few meters from the foreground, then a half-meter baseline works well. Additionally, using a per-camera weighting term designed to preserve view-dependent effects can reduce these errors. By weighing cameras closer to the reference view more heavily, we can limit the effects of self-occlusion.

We are also limited by aliasing in a light field. In practice, we have found errors due to aliasing to be significant only for our measurements for pixels in the background. Aliasing causes the variance measurements to be incorrect due to periodic textures being aligned when we synthetically refocus our data. This causes a background pixel to have non-zero alpha. There are several improvements that can alleviate these problems. The first is to use more cameras. We believe our method works well with a large, dense camera array. Even with a small number of cameras, different camera distributions can reduce aliasing artifacts. For example, the cameras can be concentrated towards the center reference camera. If one were to use a 2D array, then the system benefits from background color variation that occurs both horizontally and vertically. Furthermore, as most background structures are horizontal and vertical, using a diagonal cross arrangement can be useful, as it maximally spreads these features in the synthetically refocused images.

We also assume that the variance of the background is statistically independent and several orders of magnitude larger than that of the foreground. This is true for most scenes. In practice, even very specular surfaces have var(F) a few orders of magnitude lower than the variance of the background. In our scenes, var(F) is on the order of a few hundred or less, while var(B) is upwards of several thousand. These units are on the order of 8-bit RGB levels squared, i.e., 0 to $255^2$.

However, when the variance of the background is low, then the input reduces to a single camera input taken under known background value. In this case, we can use existing methods such as blue-screen matting, or Bayesian matting, or combing both techniques in a unified manner.

We note that in case of low-variance backgrounds the problem is under constrained, because for each pixel we have four unknowns α and αF, and only three linear constraints. Even though we know the color of the background and we know that the background is low frequency, it is possible to solve the problem by making further assumptions, e.g., assumptions about foreground color or spatial frequency of alpha and foreground. We can generalize Equation (9) to higher order statistics. This is a useful extension. More generally, we can consider the distributions and not just means and variances for pulling the matte. While eight cameras may be sufficient to estimate the mean and variance of a distribution, due to the aliasing issues discussed above, is not enough to explicitly model a distribution. However, using a camera array of, for example, 100 cameras, makes it possible to extend our method to use more sophisticated distribution models.

EFFECT OF THE INVENTION

We solve the natural video matting problem using a camera array. The solution relies on the fact that natural scenes contain high frequency details. We synthetically refocus the images from the cameras to construct a synthetic aperture image that is aligned with the view of a central reference camera and is focused on the foreground object. The synthetic aperture image is computed by taking the mean value of the images aligned to a foreground reference plane. We also compute the variance of the realigned images. Because the images are focused on the foreground, the variance values for pixels on the foreground object are much lower than those of the background. This leads to a variance image that is then double-thresholded to obtain a trimap, which in turn is used to compute an alpha matte. The process is completely automatic, in contrast with conventional methods.

By relying on mean and variance measurements, we avoid the difficult problem of computing the depth of the background or reconstructing the 3D scene. We compute alpha mattes using an upgraded matting equation that works with pixel intensity variances, instead of working directly with pixel intensity values. The result is a fast and automatic, and can work with arbitrarily complex background scenes. An additional benefit of our method is that the per-pixel running time is proportional to the number of camera.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining an alpha matte for a video acquired of a scene, comprising the steps of:
    selecting a foreground depth plane from a set of videos acquired by an array of cameras, there being one video acquired by each camera, and each video including a sequence of images, and each image including pixels, and a centrally located camera being designated as a reference camera configured to acquire a designated reference video;
    determining a trimap from variances of intensities of pixels in each image, the trimap including pixels labeled as foreground, pixels labeled as background, and pixels labeled as unknown;
    extrapolating variances of the intensities of pixels labeled as background and the pixels labeled as foreground to the pixels labeled as unknown; and
    extrapolating means of the intensities of the pixels labeled as background to the pixels labeled as unknown to determine an alpha matte for the reference video.

2. The method of claim 1, in which the array of cameras is a linear array.

3. The method of claim 1, further comprising:
    synchronizing the videos while the set of videos are acquired.

4. The method of claim 1, further comprising:
    calibrating geometrically extrinsic and intrinsic parameters of the array of cameras.

5. The method of claim 1, in which the foreground depth plane is selected to be a closest depth at which a variance of pixels within a predefined rectangle in the image is minimized.

6. The method of claim 1, in which multiple foreground depth planes are selected.

7. The method of claim 1, in which the foreground depth plane is selected interactively.

8. The method of claim 1, in which a high-variance pixel is considered part of the foreground if the high-variance pixel is located relatively near the pixels labeled as the foreground, and a low-variance pixel is considered as part of the background if the low-variance pixel is relatively far from the foreground.

9. The method of claim 1, in which the variance of the pixels in each image I is var(I), the variance of the pixels labeled as the foreground is var(F), and the variance of the pixels labeled as background is var(B), and the alpha matte is $$\alpha = (var(B) \pm \sqrt{\Delta})/(var(F)+var(B)), \text{ where } \Delta = var(I)[var(F)+var(B)]-var(F)var(B).$$

10. The method of claim 9, in which $$\alpha F = \bar{I} - (1-\alpha)\bar{B},$$

where $\bar{I}$ indicates a mean of corresponding pixel values in all images, and $\bar{B}$ is a mean of the pixels labeled as the background, and F is a foreground image.

11. The method of claim 1, in which the intensities are weighted.

12. The method of claim 1, in which the array of cameras is arranged in a substantially 2D co-planar configuration.

13. The method of claim 1, in which the foreground depth plane is selected using a synthetic aperture image.

14. A system for determining an alpha matte for a video acquired of a scene, comprising the steps of:

means for selecting a foreground depth plane from a set of videos acquired by an array of cameras, there being one video acquired by each camera, and each video including a sequence of images, and each image including pixels, and a centrally located camera being designated as a reference camera configured to acquire a designated reference video;

means for determining a trimap from variances of intensities of pixels in each image, the trimap including pixels labeled as foreground, pixels as labeled as background, and pixels labeled as unknown;

means for extrapolating variances of the intensities of pixels labeled as background and the pixels labeled as foreground to the pixels labeled as unknown; and means for extrapolating means of the intensities of the pixels labeled as background to the pixels labeled as unknown to determine an alpha matte for the reference video.

* * * * *